United States Patent [19]

Gley

[11] E Re. 30,801

[45] Reissued Nov. 24, 1981

[54] DETACHABLE QUARTER-TURN BLIND HOLE FASTENER

[75] Inventor: Paul R. Gley, Hillsdale, N.J.

[73] Assignee: Rexnord Inc., Milwaukee, Wis.

[21] Appl. No.: 71,210

[22] Filed: Aug. 30, 1979

Related U.S. Patent Documents

Reissue of:

[64] Patent No.: 3,744,101
Issued: Jul. 10, 1973
Appl. No.: 142,153
Filed: May 11, 1971

[51] Int. Cl.[3] ..... A44B 17/00; F16B 19/00

[52] U.S. Cl. ..... 24/221 K

[58] Field of Search ..... 24/221 R, 221 K, 221 A; 85/5 P

[56] References Cited

U.S. PATENT DOCUMENTS

| | | | |
|---|---|---|---|
| 2,555,291 | 5/1951 | Poupitch | 24/221 K |
| 2,629,913 | 3/1953 | Schlueter | 24/221 K |
| 3,136,017 | 6/1964 | Preziosi | 24/221 K |
| 3,152,822 | 10/1964 | Griffiths | 24/221 K X |

FOREIGN PATENT DOCUMENTS

| | | | |
|---|---|---|---|
| 1142142 | 2/1969 | United Kingdom | 24/221 K |
| 1144900 | 3/1969 | United Kingdom | 24/221 K |

*Primary Examiner*—Thomas J. Holko

[57] ABSTRACT

A detachable blind hole quarter-turn fastener for securing a panel to a frame in which means are provided for detachably securing the fastener to the panel in response to a quarter-turn of the fastener cross pin stud in one direction and for detachably securing the panel to the frame in response to a quarter-turn of the cross pin stud in the other direction.

4 Claims, 6 Drawing Figures

Fig 2
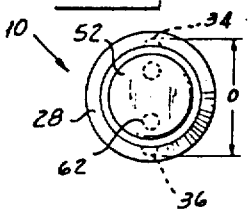
Fig 3
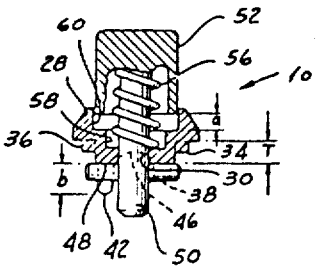
Fig 1
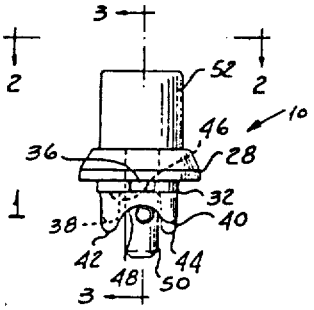
Fig 5
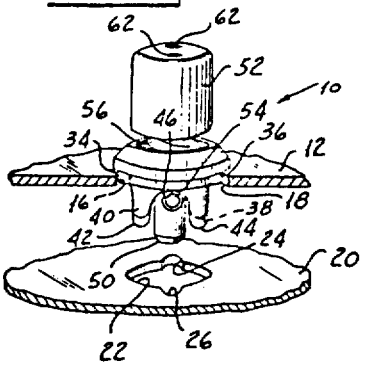
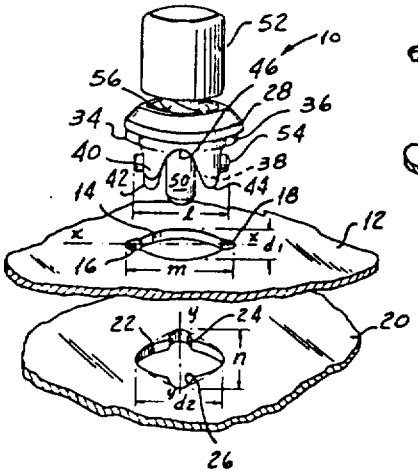
Fig 4
Fig 6
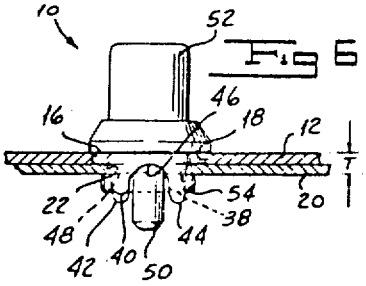

DETACHABLE QUARTER-TURN BLIND HOLE FASTENER

Matter enclosed in heavy brackets [ ] appears in the original patent but forms no part of this reissue specification; matter printed in italics indicates the additions made by reissue.

BACKGROUND OF THE INVENTION

Among the many types of fastener assemblies known in the prior art for securing a panel or the like in position on a frame is a cross pin fastener in which a stud carrying the cross pin is rotatably supported on one of the two members to be connected and a receptacle forming a cam track around an opening is carried by the other member. In use of such a fastener the axis of the cross pin is brought into alignment with extensions in the receptacle opening and after the cross pin passes through the opening the fastener is rotated to cause the cross pin ends to ride up a cam track into recesses in the receptacle to hold the parts together.

While a fastener of this type is satisfactory for most installations, it is not adapted for use in a "blind installation" wherein access cannot be gained to the rear of the frame to permit installation of the receptacle cam track. In an effort to solve this problem in the prior art it has been suggested that the entire fastener assembly be carried by the panel or the like and that the frame be provided only with a hole having extensions along a diameter thereof. In such a fastener bosses are provided on the receptacle portion for engaging in the frame hole extensions to hold the receptacle portion against rotation as the cross pin stud is rotated to a position at which the ends thereof engage the back of the frame around the hole at locations remote from the hole extensions. Spahr et al. U.S. Pat. No. 2,599,207 shows such an assembly. While an arrangement of this type successfully solves the problem of a blind installation per se in the prior art either the fastener assemblies are permanently secured to the panel or they are loose until such time as they are actually used to install a panel on the frame. In the former case fasteners which are damaged cannot readily be replaced. Moreover, fasteners of different size to accommodate panels or frames of different thickness cannot readily be substituted. The obvious disadvantage of the latter case is the possibility that the small fastener assemblies will become lost and are not readily accessible to permit the panel to be quickly secured in place on the frame.

I have invented a detachable blind hole fastener which overcomes the defects of blind hole fasteners of the prior art pointed out here and above. My blind hole fastener permits the fastener to be readily detachably secured to the panel while at the same time permitting the panel to be assembled on the frame in a rapid and expeditious manner. My detachable blind hole quarter-turn fastener is extremely simple in construction and in operation. It is relatively inexpensive to manufacture for the result achieved thereby.

SUMMARY OF THE INVENTION

One object of my invention is to provide a detachable quarter-turn fastener which is especially adapted for use with blind holes.

Another object of my invention is to provide a quarter-turn blind-hole fastener which overcomes the defects of blind-hole fasteners of the prior art.

A still further object of my invention is to provide a detachable quarter-turn blind-hole fastener which is extremely simple in operation.

A still further object of my invention is to provide a detachable quarter-turn blind-hole fastener which is relatively inexpensive to manufacture.

Another and further objects of my invention will appear from the following description.

In general, my invention contemplates the provision of an assembly of a panel having a hole with diametrically opposite extensions and a frame provided with a hole having diametrically opposite extensions along a line generally perpendicular to the line of the extensions of the panel hole together with a fastener which is detachably secured to the panel in response to a quarter turn of the fastener cross pin stud in one direction and which secures the panel to the frame in response to a quarter turn of the stud in the opposite direction.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is an elevation of the fastener assembly of my detachable quarter-turn blind hole fastener.

FIG. 2 is a top plan view of the fastener shown in FIG. 1 taken along the line 2—2 of FIG. 1.

FIG. 3 is a sectional view of the fastener shown in FIG. 1 taken along the line 3—3 of FIG. 1.

FIG. 4 is an exploded view illustrating the relative disposition of the fastener, panel and frame before the fastener is applied to the panel.

FIG. 5 is an exploded perspective view illustrating the relative positions of the parts after the fastener has been attached to the panel and before the panel has been secured to the frame.

FIG. 6 is an elevation with parts shown in section of the assembly of the fastener panel and frame.

DESCRIPTION OF THE PREFERRED EMBODIMENT

Referring now to the drawings my assembly includes a fastener indicated generally by the reference 10 is adapted to be detachably applied to a panel 12 formed with a hole 14 having diametrically opposite extensions 16 and 18 along a line x—x. The fastener 10 is adapted to secure panel 12 to frame 20 formed with an opening 22 having diametrically opposite extensions 24 and 26 lying along a line y—y relatively angularly disposed with relation to the line x—x. As will be explained more fully hereinbelow, preferably lines x—x and y—y are generally perpendicular to each other.

The fastener 10 includes a bushing 28 having a central bore 30. I provide bushing 28 with a reduced diameter portion 32, the diameter of which is slightly less than that of hole 14 to permit the portion 32 to be inserted in the hole in a manner to be described. The reduced diameter portion 32 has diametrically oppositely extending bosses 34 and 36 adapted to ride into the extensions 16 and 18 correctly to orient the fastener 10 when it is applied to panel 14 in a manner to be described.

I form the underside of bushing 28 with respective downwardly extending locking elements 38 and 40 at diametrically opposite locations around the bore 30. I also provide the underside of the stud 28 with downwardly extending stops 40 and 42 at diametrically opposite locations generally midway between the locking elements 38 and 40. In this manner I form a first pair of opposite recesses 46 respectively between element 38 and stop 42 and between element 40 and stop 44 as well as a second pair of recesses 48 respectively between element 38 and stop 44 and between element 40 and stop 42. It is to be noted that recesses 46 are deeper than are the recesses 48 for a reason which will be apparent from the description given hereinafter. Moreover the axial distance "t" between the shoulder formed by bushing portion 32 and the base of a recess 38 is equal to the aggregate thickness of panel 12 and frame 20.

Fastener 10 includes a stud 50 extending from a head or knob 52 through the bore 30. I mount a cross pin 54 on the stud [52] *50* at a location below the bore 30. A spring 56 surrounding the stud 50 bears between the head or knob 52 and the base of a recess 58 in bushing 28 above bore 30 normally to urge the stud 50 upwardly as viewed in the drawings to move the cross pin into engagement with the underside of the bushing. I form the interior of the bushing above recess 58 with an enlargement 50 into which head 52 can be pushed in operation of the fastener in a manner to be described. Preferably I mark the top of the head 52 with a pair of dots 62 aligned with the cross pin axis so that the position of the dots indicate the condition of the fastener.

In use of my fastener, the parts initially occupy the position illustrated in FIGS. 1 to 3 in which position the ends of the cross pin rest in the relatively shallower recesses 48 in the underside of the bushing 28. To apply the fastener to a panel 12 as illustrated in FIGS. 4 and 5 cross pin 54 is positioned in alignment with enlargements 16 and 18. Dots 62 may assist in aligning the cross pin. The length "1" of the cross pin is less than the distance "m" between the outer edges of recesses 16 and 18 and is greater than the diameter "d 1" of the hole 14.

As the assembly is moved into the hole 14 bosses 34 and 36 are located in recesses 16 and 18 to restrain the bushing against rotation in response to rotary movement of the head 52. Next the head 52 is pushed inwardly to move the cross pin below the level of the locking elements 38 and 40. When that has been done head 52 is rotated through a quarter turn in a counterclockwise direction to move the cross pin ends under elements 38 and 40. It will be noted that the head 52 cannot be moved inwardly far enough to permit the cross pin ends to clear the stops 42 and 44. When the head is released spring 56 moves the stud 50 axially to move the cross pin toward recesses 46 in the course of which movement the cross pin ends engage the underside of the panel 12. It will readily be appreciated that in this position of the parts cross pin 54 is aligned with the line y—y of the recesses 24 and 26 in frame 20.

The length "1" of the cross pin is less than the distance "n" between the outer edges of recesses 24 and 26 and is greater than the diameter "d 2" of hole 22. With the parts in this position head 52 is again moved inwardly a sufficient distance to permit the cross pin ends to clear elements 38 and 40 and the head is rotated through a quarter turn in the clockwise direction and then is released. Upon its release spring 56 moves the cross pin in the direction of the axis of rotation to cause the ends of the cross pin to move toward recess 48 and to engage the underside of frame 20 outside hole 22 along the line generally perpendicular to the line y—y. Panel 12 now is releasably secured to the frame 20.

As indicated by the broken lines in FIG. 4 rather than making the hole 22 circular I may form an eliptical hole having a major axis which is longer than the cross pin 54 and having a minor axis which is shorter than the cross pin.

It will readily be appreciated that in an actual installation a plurality of fasteners 10 are employed with a panel 12 and are spaced around the periphery thereof. Should any one of the assemblies be defective or become damaged which can readily be replaced merely by reversing the operation described above to assemble the fastener on panel 12 thus to remove the fastener. When that is done a new fastener may readily be applied to the panel.

It will be seen that I have accomplished the objects of my invention. I have provided a detachable quarter turn fastener which is especially adapted for use on blind holes. My fastener overcomes the defects of quarter turn blind hole fasteners of the prior art. It is readily assembled on to and disassembled from the panel while at the same time permitting the panel to be secured to a frame in a simple and expeditious manner. It is simple in construction and in operation. It is relatively inexpensive to manufacture.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An assembly of a fastener and a panel and a frame including in combination, a panel formed with an opening having a major diametral dimension and a minor dimetral dimension, a frame formed with an opening having a major diametral dimension and a minor diametral dimension, said frame opening major and minor dimensions extending respectively generally in the directions of the panel minor and major dimensions, a fastener formed with *a bushing having* a shoulder adapted to engage the outside of said panel around said opening, a stud mounted in said bushing for rotary and for limited axial movement, a cross pin on said stud adjacent to the inside of said panel, said cross pin having a length less than said major diametral dimensions and greater than said minor diametral dimensions, means for biasing said stud for axial movement of said cross pin toward said bushing, means forming spaced locking elements on said bushing over which said cross pin moves in response to rotary movement of said stud in one direction and concomitant axial movement against the action of said biasing means to align said cross pin with the minor dimension of said panel releasably to retain said fastener on said panel, and stops on said bushing angularly disposed between said locking elements, said stops extending axially for a distance greater than said limited axial movement of said stud to prevent rotary movement of said stud beyond the point at which the cross pin engages the stops, said cross pin riding over said locking elements and into alignment with the minor dimension of said frame in response to rotary movement of said stud in the other direction to engage the inner surface of said frame releasably to secure the panel to the frame.

2. An assembly as in claim 1 in which said bushing comprises bosses for engaging the edge of the panel hole in the region of the ends of its major dimension.

3. An assembly as in claim 2 in which said locking elements and said stops form respective pairs of diametral recesses, the recesses of one pair being deeper than the recesses of the other pair, said deeper recesses being generally perpendicular to said bosses.

4. A fastener assembly including in combination, a bushing having a bore therein, a stud mounted in said bushing for rotary and for limited axial movement, means forming a pair of circumferentially spaced axially extending locking elements on the underside of said bushing, means forming respective axially extending stops on the underside of said bushing between said locking elements to provide respective pairs of diametrically opposite recesses, the recesses of one pair being deeper than the recesses of the other pair, a crosspin carried by said stud below the underside of said bushing, means for urging said stud in an axial direction to move said cross pin toward said recesses and means for limiting the axial movement of said stud to a distance less than the axial extent of said stops from the underside of said bushing.

* * * * *